OR RE 10,319

SUBSTITUTED FOR MISSING COPY

Examiner

W. X. STEVENS.

MECHANICAL TOY.

No. 10,319. Reissued Apr. 24, 1883.

WITNESSES.

S. E. Stevens.

P. E. Stevens.

INVENTOR

William X. Stevens.

N. PETERS, Photo-Lithographer, Washington, D.C.

UNITED STATES PATENT OFFICE.

WILLIAM X. STEVENS, OF WASHINGTON, DISTRICT OF COLUMBIA.

MECHANICAL TOY.

SPECIFICATION forming part of Reissued Letters Patent No. 10,319, dated April 24, 1883.

Original No. 274,148, dated March 20, 1883. Application for reissue filed April 4, 1883.

*To all whom it may concern:*

Be it known that I, WILLIAM X. STEVENS, a citizen of the United States, residing at Washington, in the District of Columbia, have invented a new Mechanical Toy, of which the following is a specification.

The object of my invention is to produce a mechanical toy with which children may entertain themselves, and to make the same simple and inexpensive, yet attractive. To this end it is an imitation of the game of leap-frog; and it consists in the construction and combination of parts hereinafter described and claimed, reference being had to the accompanying drawings, in which—

Figure 1:
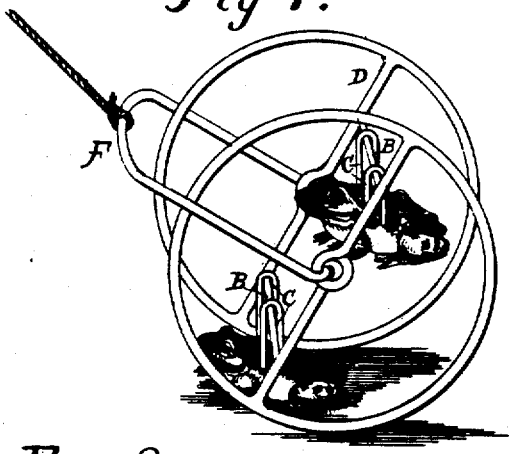
Figure 2:
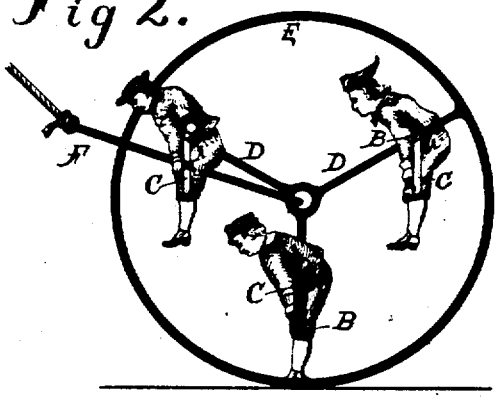

Figure 1 is a perspective view of my invention, showing two frogs as actors; and Fig. 2 is a side elevation, showing three boys as the actors.

A represents the actors, which may be frogs or any other figures of animate or inanimate things. These actors are hung to swing freely upon cross-bars B by means of loops C. The cross-bars are secured at their ends to spokes D of the wheels E. The wheels are provided with holes at their centers to serve as bearings in which the two ends of a bail, F, are supported. This bail may be long enough to serve as a handle for the child to draw or push the wheel by, or its central part may be extended just enough away from the wheels to allow the actors to pass it freely. When the wheels are rolled along the floor the actors will, each in turn, be lifted from the floor and carried over the other. Each cross-bar B is secured to the wheel at a distance within its circumference sufficient to allow the actor, or some portion thereof, to remain between the cross-bar and the floor when the bar is at its lowest point. The loops C are made long, so that the actor may land on the floor before his supporting-bar reaches its lowest point, and remain nearly at rest while the bar descends in the loop and rises again in rear of the center of the wheel, suddenly lifting the actor on reaching the top of the loop, and carrying it in an upright position over in the arc of a circle and again landing it. The most perfect imitation of leap-frog is produced when the loops C are as long as they can be and carry each actor clear over the others. These loops may be wire staples, as shown in Fig. 1, or they may be slots cut in the figures, as in Fig. 2. In the latter case the feet of the actors should be weighted to make the actors stand up when not hanging on the cross-bars. As a substitute for loops C cords or other flexible or elastic hangers may be used, either by looping one end of each cord over a bar, B, and hanging the actors on the other ends, or by hanging said cord to any portion of the wheel at a distance from center and making them long enough to allow the figure to land while its points of attachment to the wheel are descending. Cords thus hung between two wheels carrying the actors loosely like common swings, to land as stated, will produce nearly the same effect as the long rigid loops. The cords may be hung to the edges of the wheels, if desired, to give more motion to the actors, because, being flexible, the cords will hang loosely as soon as the actors land.

The staples or the elongated loops B, or their equivalents, such as elastic or flexible supports, which will, when properly attached to the actors and to the wheel, first raise the actors, then carry them forward and land them by the rolling of the wheel, act as "self-adjusting hangers," and that term will be hereinafter used to indicate such supports.

As another modification, a wheel or disk may be made thick enough to stand on edge and carry the actors by means of the cross-bars B, projecting from one or both sides of it, supporting the actors on the self-adjusting hangers; or a wheel-axle may be bent into cranks to serve as cross-bars B. By making the actors relatively smaller the two wheels may be connected by an axle, and one or more figures hung upon the axle to revolve with it or to hang freely on it, and the actors made to pass over it—as, for example, dogs leaping over their trainer. The landing of my actors at each revolution of the wheel prevents their traveling in complete circles relative to the center of the wheel, such path of each actor being the arc and the chord alternately of the segment of a circle.

In using the word "wheel" throughout this specification I mean any style of wheel, hoop, or disk which will roll upon the floor, and by "floor" I mean the ground, a floor, or any substitute therefor on which the actors may land unsupported by their hangers during a portion of the wheel's revolution.

I am aware that toy figures have been hung within a hoop to swing on cross-bars and to revolve in circles when the hoop revolves, but not hung by self-adjusting hangers, and not therefore capable of landing during part of each revolution either upon the floor or upon anything which would prevent said figures revolving in complete circles.

I am also aware that toy figures have been hung within a hoop to roll on the inner face thereof, not being lifted to revolve about the hoop's center, and I do not claim these articles as my invention; but

What I claim, and wish to secure by Letters Patent, is—

1. The combination, with a wheel, of a toy figure or figures hung thereto at a distance from the center thereof by self-adjusting hangers, substantially as described, for the purpose specified.

2. The combination, with a wheel, hoop, or disk, of toy figures hung thereon by staples, loops, or flexible or elastic supports, whereby said figures alternate in resting upon the floor and in passing over each other when the wheel rolls, as described.

3. Two hoops, wheels, or disks connected together at a distance from center by two or more cross-bars, in combination with figures of frogs or other objects hung to said bars by self-adjusting hangers, substantially as described.

4. One or more wheels adapted to roll on edge, and having bars projecting from the side or sides thereof, in combination with toy figures hung upon said bars by self-adjusting hangers, as and for the purpose specified.

WILLIAM X. STEVENS.

Witnesses:
S. E. E. STEVENS,
P. E. STEVENS.